(12) United States Patent
Jahnke et al.

(10) Patent No.: US 11,710,836 B2
(45) Date of Patent: Jul. 25, 2023

(54) HYDROGEN GENERATION USING A FUEL CELL SYSTEM WITH AN REP

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 419 days.

(21) Appl. No.: 16/878,112

(22) Filed: May 19, 2020

(65) Prior Publication Data

US 2020/0287224 A1 Sep. 10, 2020

Related U.S. Application Data

(63) Continuation of application No. PCT/IB2018/059191, filed on Nov. 21, 2018.

(60) Provisional application No. 62/590,112, filed on Nov. 22, 2017.

(51) Int. Cl.
| | | |
|---|---|---|
| *H01M 8/04* | (2016.01) | |
| *H01M 8/04014* | (2016.01) | |
| *C25B 1/04* | (2021.01) | |
| *C25B 15/08* | (2006.01) | |
| *H01M 8/04119* | (2016.01) | |
| *H01M 8/0612* | (2016.01) | |
| *H01M 8/0656* | (2016.01) | |

(52) U.S. Cl.
CPC .......... *H01M 8/04014* (2013.01); *C25B 1/04* (2013.01); *C25B 15/08* (2013.01); *H01M 8/04126* (2013.01); *H01M 8/0618* (2013.01); *H01M 8/0625* (2013.01); *H01M 8/0656* (2013.01)

(58) Field of Classification Search
CPC ......... H01M 8/04014; H01M 8/04126; H01M 8/0618; H01M 8/0625
See application file for complete search history.

(56) References Cited

U.S. PATENT DOCUMENTS

| | | |
|---|---|---|
| 7,150,927 B2 | 12/2006 | Hickey et al. |
| 7,201,979 B2 | 4/2007 | McElroy et al. |
| 7,364,810 B2 | 4/2008 | Sridhar et al. |
| 7,422,810 B2 | 9/2008 | Venkataraman et al. |

(Continued)

FOREIGN PATENT DOCUMENTS

| | | |
|---|---|---|
| EP | 1 620 906 | 2/2006 |
| EP | 1 665 441 | 6/2006 |

(Continued)

OTHER PUBLICATIONS

International Search Report and Written Opinion in PCT/IB2018/059191 dated Mar. 27, 2019 (20 pages).

*Primary Examiner* — Olatunji A Godo
(74) *Attorney, Agent, or Firm* — Foley & Lardner LLP (57) ABSTRACT

A fuel cell system includes a fuel cell having an anode and a cathode configured to output cathode exhaust. The fuel cell is configured to generate waste heat. The fuel cell system further includes a reformer configured to partially reform a feed gas using the waste heat and output a hydrogen-containing stream. The fuel cell system further includes a reformer-electrolyzer-purifier ("REP") having an REP anode configured to receive a first portion of the hydrogen-containing stream and an REP cathode.

18 Claims, 3 Drawing Sheets

(56) References Cited

U.S. PATENT DOCUMENTS

| | | |
|---|---|---|
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,277,992 B2 | 10/2012 | Mitlitsky et al. |
| 8,435,689 B2 | 5/2013 | Venkataraman |
| 8,663,859 B2 | 3/2014 | Mitlitsky et al. |
| 8,852,820 B2 | 10/2014 | Perry et al. |
| 9,190,693 B2 | 11/2015 | Sridhar et al. |
| 9,413,017 B2 | 8/2016 | Bandhauer et al. |
| 9,722,273 B2 | 8/2017 | Perry et al. |
| 9,911,989 B2 | 3/2018 | Mcelroy et al. |
| 9,947,955 B2 | 4/2018 | Sridhar et al. |
| 10,096,840 B1 | 10/2018 | Venkataraman et al. |
| 10,361,442 B2 | 7/2019 | Perry et al. |
| 10,581,090 B2 | 3/2020 | Ballantine et al. |
| 2010/0266923 A1 | 10/2010 | Mcelroy et al. |
| 2011/0189567 A1 | 8/2011 | Venkataraman et al. |
| 2013/0260268 A1 | 10/2013 | Shapiro et al. |
| 2016/0351930 A1 | 12/2016 | Jahnke et al. |
| 2020/0161671 A1 | 5/2020 | Ballantine et al. |

FOREIGN PATENT DOCUMENTS

| | | | |
|---|---|---|---|
| WO | WO2015116964 | * | 8/2015 |
| WO | WO-2017/087518 A1 | | 11/2016 |
| WO | WO-2017/087405 A1 | | 5/2017 |

\* cited by examiner

HYDROGEN GENERATION USING A FUEL CELL SYSTEM WITH AN REP

CROSS-REFERENCE TO RELATED APPLICATION

The present application is a bypass continuation of International Application No. PCT/IB2018/059191 filed on Nov. 21, 2018, which claims the benefit of and priority to U.S. Provisional Patent Application No. 62/590,112, filed Nov. 22, 2017, the entire disclosures of which are hereby incorporated by reference.

STATEMENT OF GOVERNMENT RIGHTS

This invention was made with government support under DE-EE0006669 awarded by the Department of Energy. The government has certain rights in this invention.

BACKGROUND

The present application relates generally to the field of $H_2$ ("hydrogen") generation by integrating a reforming-electrolyzer-purifier ("REP") with a high-temperature fuel cell. Specifically, an REP may be used with the fuel cell to generate hydrogen. Examples of REPs and systems that include them are described in PCT Publication No. WO 2015/116964, which is assigned to the assignee of the present application.

An REP requires partially-reformed fuel in order to maintain an even temperature profile and heat balance within the REP during operation. For example, the presence of a small amount more $CH_4$ ("methane") than is desired from the reforming process may have a substantial impact on providing a consistent temperature profile in the REP. However, reforming the fuel often requires specialized equipment in the fuel preparation, conversion, and reforming heat supply, which may increase cost and complexity of the system as well as operating cost for the additional equipment. It may, therefore, be advantageous to incorporate the desired feed preparation and partial reforming process into a fuel cell in a fuel cell system.

SUMMARY

One embodiment relates to a fuel cell system including a fuel cell having an anode and a cathode configured to output cathode exhaust. The fuel cell is configured to generate waste heat. The fuel cell system further includes a reformer configured to partially reform a feed gas using the waste heat and output a hydrogen-containing stream. The fuel cell system further includes an REP having an REP anode configured to receive a first portion of the hydrogen-containing stream and an REP cathode.

In one aspect of the fuel cell system, which is combinable with the above embodiments and aspects in any combination, a heat exchanger is configured to heat the feed gas using the waste heat and to output a heated feed gas. The waste heat is conveyed to the heat exchanger in the cathode exhaust. The reformer is configured to receive the heated feed gas.

In another aspect of the fuel cell system, which is combinable with the above embodiments and aspects in any combination, the fuel cell is configured to receive a remaining portion of the hydrogen-containing stream.

In another aspect of the fuel cell system, which is combinable with the above embodiments and aspects in any combination, the fuel cell system further includes an indirect reforming unit disposed on the anode. The indirect reforming unit is configured to further reform the hydrogen-containing stream and output a fuel turn gas.

In another aspect of the fuel cell system, which is combinable with the above embodiments and aspects in any combination, a first portion of the fuel turn gas is the first portion of the hydrogen-containing stream received by the REP anode, and the anode is configured to receive a remaining portion of the fuel turn gas.

In another aspect of the fuel cell system, which is combinable with the above embodiments and aspects in any combination, the REP anode is configured to receive a portion of anode exhaust output from the anode.

In another aspect of the fuel cell system, which is combinable with the above embodiments and aspects in any combination, the anode is configured to receive a remaining portion of the fuel turn gas output from the indirect reforming unit.

In another aspect of the fuel cell system, which is combinable with the above embodiments and aspects in any combination, the fuel cell system further includes an anode gas oxidizer ("AGO") configured to receive anode exhaust from the anode and to oxidize the anode exhaust with air from an air supply, and a heat transfer element disposed in the AGO. The fuel cell system is configured to mix first portion of the fuel turn gas with water from a water supply to form a hydrated feed gas. The heat transfer element is configured to receive the hydrated feed gas and transfer heat from an oxidation reaction in the AGO to the hydrated feed gas.

In another aspect of the fuel cell system, which is combinable with the above embodiments and aspects in any combination, the REP anode is configured to receive the hydrated feed gas from the heat transfer element.

In another aspect of the fuel cell system, which is combinable with the above embodiments and aspects in any combination, the fuel cell system further includes a second reformer disposed between the heat transfer element and the REP anode. The second reformer is configured to further reform the hydrated feed gas before introduction to the REP anode.

In another aspect of the fuel cell system, which is combinable with the above embodiments and aspects in any combination, the reformer is configured to receive heat from an oxidation reaction in the AGO.

In another aspect of the fuel cell system, which is combinable with the above embodiments and aspects in any combination, the fuel cell system further includes an anode gas oxidizer ("AGO") configured to receive anode exhaust from the anode. The AGO is configured to oxidize the anode exhaust with air from an air supply.

In another aspect of the fuel cell system, which is combinable with the above embodiments and aspects in any combination, the AGO is configured to receive heated sweep gas from the REP cathode.

In another aspect of the fuel cell system, which is combinable with the above embodiments and aspects in any combination, the fuel cell system further includes a heat transfer element disposed in the AGO. The fuel cell system is configured to mix a first portion of the hydrogen-containing stream with water roan a water supply to form a hydrated feed gas. The heat transfer element is configured to receive the hydrated feed gas and to transfer heat from an oxidation reaction in the AGO to the hydrated feed gas.

In another aspect of the fuel cell system, which is combinable with the above embodiments and aspects in any combination, the REP anode is configured to receive the hydrated feed gas from the heat transfer element.

In another aspect of the fuel cell system, which is combinable with the above embodiments and aspects in any combination, the fuel cell system further includes a second reformer disposed between the heat transfer element and the REP anode. The second reformer is configured to further reform the hydrated feed gas before introduction to the REP anode.

In another aspect of the fuel cell system, which is combinable with the above embodiments and aspects in any combination, the reformer is configured to receive heat from an oxidation reaction in the AGO.

In another aspect of the fuel cell system, which is combinable with the above embodiments and aspects in any combination, the fuel cell system further includes a heat transfer element disposed in the AGO and configured to receive air from the air supply and transfer heat from an oxidation reaction in the AGO to the air passing through the heat transfer element.

In another aspect of the fuel cell system, which is combinable with the above embodiments and aspects in any combination, the REP cathode is configured to receive the air passing through the heat transfer element as sweep gas.

In another aspect of the fuel cell system, which is combinable with the above embodiments and aspects in any combination, the REP anode is configured to receive steam from a water supply.

Another embodiment relates to a method of operating a fuel cell system including providing a fuel cell having an anode and a cathode, providing a reformer, and providing an REP having an REP anode and an REP cathode. The method further includes generating waste heat from the fuel cell and heating the feed gas with the waste heat, forming heated feed gas. The method further includes partially reforming the heated feed gas in the reformer and outputting a hydrogen-containing stream and feeding a first portion of the hydrogen-containing stream to the REP anode.

In one aspect of the method, which is combinable with the above embodiments and aspects in any combination, the method further includes hydrating the first portion of the hydrogen-containing stream with steam from a water supply to form a hydrated feed gas.

In another aspect of the method, which is combinable with the above embodiments and aspects in any combination, the method further includes feeding a remaining portion of the hydrogen-containing stream to the anode and outputting anode exhaust from the anode.

In another aspect of the method, which is combinable with the above embodiments and aspects in any combination, the method further includes reforming the hydrated feed gas prior to introduction to the REP anode.

In another aspect of the method, which is combinable with the above embodiments and aspects in any combination, the method further includes oxidizing the anode exhaust in an AGO and transferring heat from the AGO to the hydrated feed gas.

In another aspect of the method, which is combinable with the above embodiments and aspects in any combination, the method further includes transferring heat from the AGO to air from an air supply and feeding the heated air to the REP cathode for use as sweep gas.

In another aspect of the method, which is combinable with the above embodiments and aspects in any combination, the sweep gas maintains a substantially uniform temperature across the REP cathode.

In another aspect of the method, which is combinable with the above embodiments and aspects in any combination, the method further includes receiving the sweep gas at the AGO and oxidizing the anode exhaust with the sweep gas.

In another aspect of the method, which is combinable with the above embodiments and aspects in any combination, the method further includes mixing a portion of the anode exhaust with the hydrated feed gas prior to introduction to the REP anode.

Another embodiment relates to a fuel cell system including a feed system having a water supply and a fuel supply. The feed system is configured to purify water from the water supply and fuel from the fuel supply, and to mix the water and fuel to form a hydrated feed gas. The fuel cell system further includes a fuel cell having an anode configured to receive a first portion of the hydrated feed gas, and a cathode. The fuel cell system further includes a reformer-electrolyzer-purifier ("REP") having an REP anode configured to receive a second portion of the hydrated feed gas, and an REP cathode.

In one aspect of the fuel cell system, which is combinable with the above embodiments and aspects in any combination, the fuel cell system further includes a water treatment system configured to purify the water from the water supply.

In another aspect of the fuel cell system, which is combinable with the above embodiments and aspects in any combination, the fuel cell system further includes a first heat exchanger configured to receive the hydrated feed gas and to vaporize at least a portion of the water in the hydrated feed gas.

In another aspect of the fuel cell system, which is combinable with the above embodiments and aspects in any combination, the fuel cell system further includes a second heat exchanger configured to receive the hydrated feed gas and to vaporize water in the hydrated feed gas remaining after passing through the first heat exchanger.

In another aspect of the fuel cell system, which is combinable with the above embodiments and aspects in any combination, the fuel cell system further includes a reformer configured to reform a portion of the hydrated feed gas to hydrogen.

In another aspect of the fuel cell system, which is combinable with the above embodiments and aspects in any combination, the fuel cell system further includes at least one of a hydrogen purification device or a hydrogen pressurization device configured to recycle at least a portion of hydrogen output from the REP anode to the feed system.

In another aspect of the fuel cell system, which is combinable with the above embodiments and aspects in any combination, the fuel cell system is configured to mix the hydrogen from the REP anode with the hydrated feed gas.

DETAILED DESCRIPTION

A reformer-electrolyzer-purifier ("REP") assembly includes at least one electrolyzer molten carbonate fuel cell and may include a plurality of electrolyzer fuel cells formed in a fuel cell stack, also referred to as an REP stack. The at least one electrolyzer fuel cell is a cell operated in reverse so as to electrolyze water to produce hydrogen, and at the same time to purify the hydrogen from the hydrocarbon reforming process by electrochemically removing $CO_3$ ions. $CO_2$ may be provided by reforming a hydrocarbon, such as methane. Removal of the $CO_3$ ions then drives the reforming reaction to completion.

Before undergoing the electrochemical reaction in a fuel cell, hydrocarbon fuels such as methane, coal gas, etc. are typically reformed to produce hydrogen for use in the anode of the fuel cell. In internally reforming fuel cells, a steam reforming catalyst is placed within the fuel cell stack to allow direct use of hydrocarbon fuels without the need for expensive and complex reforming equipment. In addition, the endothermic reforming reaction can be used advantageously to help cool the fuel cell stack. Internally reforming fuel cells employing direct internal reforming and indirect internal reforming have been developed.

Direct internal reforming ("DIR") is accomplished by placing a reforming catalyst ("DIR catalyst") within the active anode compartment. This catalyst is exposed to the electrolyte of the fuel cell.

Indirect internal reforming ("IIR") is accomplished by placing the reforming catalyst ("IIR catalyst") in an isolated chamber within the fuel cell stack and routing the reformed gas from this chamber into the anode compartment of the fuel cell.

A REP stack generally includes a molten carbonate fuel cell ("MCFC") stack and a system using an REP stack includes a power supply for supplying power to the REP stack for driving the electrolysis reactions. Although a system generally includes reforming, such as internal or external reforming, it is also contemplated that the REP and/or the system more generally may omit internal and/or external reforming, and may be used for electrolyzing a supply gas containing $CO_2$ and water and operating and purifying hydrogen without reforming.

Figure 1:
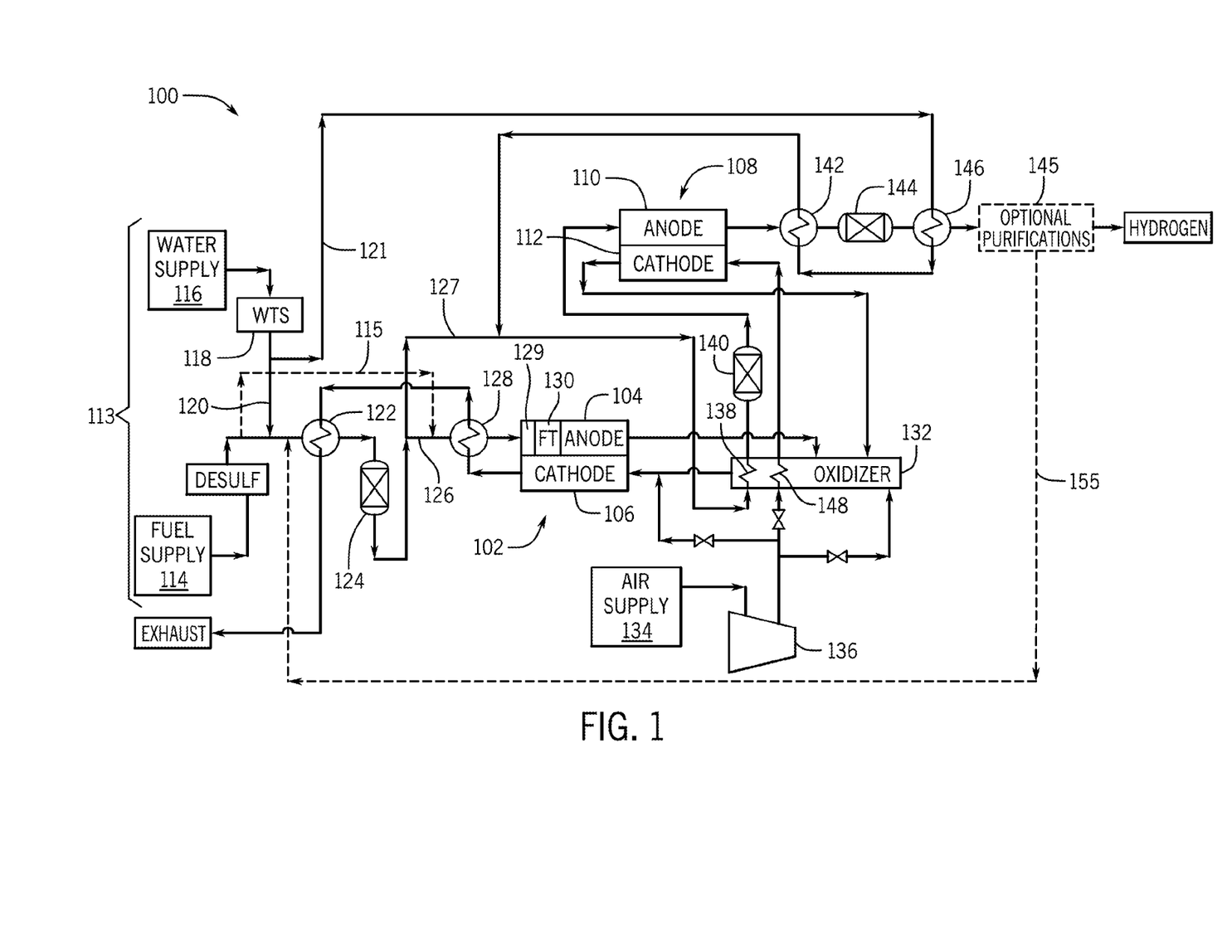
FIG. 1 is a schematic view of a fuel cell system, integrated with a reformer-electrolyzer-purifier ("REP"), according to an exemplary embodiment.

Referring to FIG. 1, a fuel cell system 100 is shown according to an exemplary embodiment. The system 100 includes a fuel cell 102 (e.g., base load direct fuel cell (SureSource™ fuel cell) or solid oxide fuel cell ("SOFC"), having an anode 104 and a cathode 106. While the fuel cell 102 is shown having one anode 104 and one cathode 106, it should be understood that the fuel cell 102 may be configured as a fuel cell stack having a plurality of fuel cells stacked in series. The system 100 further includes an REP 108 (e.g., a second fuel cell), having an REP anode 110 and an REP cathode 112. Similarly to the fuel cell 102, while the REP 108 is shown having one anode 110 and one cathode 112, it should be understood that the REP 108 may be configured as a cell stack having a plurality of cells stacked in series.

Fuel and water are fed to the system 100 as part of a feed system 113, for operation of the fuel cell 102 to output power and of the REP 108 to output hydrogen. The feed system 113 includes a fuel supply 114 and a water supply 116. The fuel fed to the system 100 from the fuel supply 114 may include natural gas, anaerobic digester gas ("ADG"), and/or other suitable fuel. The fuel is then desulfurized, such that it may be received in the fuel cell 102 without causing damage to or degradation of the fuel cell 102 due to sulfur buildup. The water fed to the system 100 from the water supply 116 is purified in a water treatment system ("WTS") 118 (i.e., purifier). A first portion 120 of the water output from the WTS 118 is mixed with the desulfurized fuel, forming a hydrated (e.g., saturated) feed gas (i.e., fuel/water mixture).

The feed gas is then fed through a first heat exchanger 122. Heat is transferred in the first heat exchanger 122 from cathode exhaust output by the cathode 106 of the fuel cell 102 to the feed gas, vaporizing substantially all of the water and increasing the temperature of the feed gas. The heated feed gas is then fed to a first reformer 124 (i.e., a preconverter), in which the heated feed gas is reformed (e.g., slightly reformed) by reacting the fuel with steam to produce hydrogen. For example, approximately 1-2% of methane in the heated feed gas is reformed to hydrogen. The reforming reaction in the first reformer 124 is endothermic and preheating the feed gas in the first heat exchanger 122 prior to feeding the feed gas to the first reformer 124 provides the heat needed for the conversion of some of the feed gas to hydrogen. According to some embodiments, a small amount of hydrogen may be required in the feed gas to prevent damage to indirect reforming cells 129 inside the fuel cell 102. The first reformer 124 then outputs a slightly reformed feed gas (i.e., a hydrogen-containing stream) configured to be received at the fuel cell 102 and the REP 108.

A first portion 126 of the slightly reformed feed gas is then fed through a second heat exchanger 128. Heat is transferred in the second heat exchanger 128 from the cathode exhaust output by the cathode 106 to the first portion 126 of the reformed feed gas, increasing the temperature of the reformed feed gas.

Referring still to FIG. 1, after passing through the second heat exchanger 128, the first portion 126 of the slightly reformed feed gas is then fed to the fuel cell 102 for reaction. Specifically, the slightly reformed feed gas is received in the fuel cell 102 at an indirect reforming unit 129 (e.g., fuel turn). The indirect reforming unit 129 is disposed on (e.g., directly on) the anode 104 of the fuel cell 102 and is configured to pass at least a portion of (e.g., all of) the feed gas received in the indirect reforming unit 129 to the anode 104. Feed gas output from the indirect reforming unit 129, which may be referred to as fuel turn gas or a hydrogen-containing stream (and output into a fuel turn manifold 130), is partially reformed even further in the indirect reforming unit 129 before it is fed to the anode 104 or the REP 108. The partial reforming process in the indirect reforming unit 129 is endothermic, such that heat is passed from the anode 104 and/or the cathode 106 to the indirect reforming unit 129, thereby cooling the fuel cell 102 during operation.

After reaction of the fuel turn gas in the anode 104, the anode 104 outputs anode exhaust (a mixture of $CO_2$, $H_2O$, $H_2$ and CO), which is fed to an anode gas oxidizer ("AGO") 132. The AGO 132 further receives air from an air supply 134, which is compressed and pumped into the AGO 132 through a compressor/blower 136. The AGO 132 further receives heated air from the REP cathode 112, which includes the $CO_2$ and oxygen from the REP 108. The heated air may be used as sweep gas in the REP cathode 112 before being fed to the AGO 132. The operation of the REP 108 transfers $CO_2$ and oxygen to the heated air used as sweep gas, thereby increases the voltage and performance (e.g., power output) of the fuel cell 102. Furthermore, air sweeping of the REP cathode 112 also improves performance of the REP 108 by reducing the voltage and power required for operating the REP 108. The air supplied to the REP 108 must be heated before being sent to the REP 108 in order to maintain a consistent thermal profile within the REP 108. The anode exhaust is oxidized in the AGO 132 with the air from the air supply 134 and the sweep gas from the REP cathode 112, and the AGO 132 outputs an oxidized feed gas to the cathode 106. Additional air may then be mixed with the oxidized feed gas downstream from the AGO 132 and upstream from the cathode 106 in order to provide a desired temperature to the cathode 106, which is less than an oxidizer outlet temperature of the AGO 132. In the cathode 106, $CO_2$ and oxygen are reacted and transferred to the anode 104 to produce power and the cathode 106 outputs a cathode exhaust. The cathode exhaust is then passed through the second heat exchanger 128, where heat is transferred from the cathode exhaust to the reformed feed gas, as discussed above. The cathode exhaust is then passed through the first heat exchanger 122, where heat is transferred from the cathode exhaust to the feed gas, as discussed above. After passing through the first and second heat exchangers 122, 128, the cathode exhaust may be output from the system 100 or used in other portions of the system 100 for heat transfer or as a heat source.

According to an exemplary embodiment, a second portion 127 of the slightly reformed feed gas may be fed to the REP 108. Specifically, a second portion 121 of the water from the WTS 118 is mixed with the second portion 127 of the reformed feed gas, forming a hydrated feed gas with a higher water content than the reformed feed gas. This additional water may be needed in the REP 108 to compensate for water that is consumed in the REP electrolysis reaction ($H_2O+CO_2 \rightarrow H_2+CO_3$). If there is insufficient heat recovery in heat exchangers 142 and 146 (discussed in further detail below) to vaporize and heat the additional water needed, water may be shifted from the second portion 121 of the water to the first portion 120 of the water and vaporized with cathode exhaust in the heat exchanger 122. In this configuration, in order to avoid excess steam from being sent to the fuel cell 102, a portion of the desulfurized fuel (i.e., bypass fuel 115) may be bypassed around the pre-converter 124 and fuel takeoff to the REP 108 (e.g., where the second portion 127 of the slightly reformed feed gas is separated) in order to reduce the steam-to-fuel ratio to the normal levels fed to the fuel cell 102. As shown in FIG. 1, the bypass fuel 115 is introduced downstream from where the first and second portions 126, 127 of the reformed feed gas are formed, such that the bypass fuel 115 is only mixed in the first portion 126 of the reformed feed gas.

The hydrated feed gas, combining the second portion 127 of the slightly reformed feed gas and the second portion 121 of the water is then received in the AGO 132 at a first heat transfer element 138. Specifically, as the hydrated feed gas passes through the first heat transfer element 138, heat is transferred from the oxidization reaction in the AGO 132 to the hydrated REP feed gas, increasing the temperature of the hydrated feed gas. The heated hydrated feed gas is then fed to a second reformer 140, in which the hydrated feed gas is further reformed. According to an exemplary embodiment, the second reformer 140 may be located inside the AGO 132 to facilitate the transfer. The second reformer 140 outputs a reformed feed gas, which is fed to the REP anode 110 for reaction in the REP 108. The amount of reforming in the feed gas to the REP 108 is controlled to a desired level by the amount of heat transferred in the first heat transfer element 138. This balances the heat in the REP 108 and results in a smooth temperature profile in the REP 108. The REP anode 110 outputs hydrogen (e.g., 95-98% purity) as REP anode exhaust. According to another exemplary embodiment, heat may also be transferred directly to the second reformer 140 from the AGO 132.

The REP anode exhaust is then fed through a third heat exchanger 142. Heat is transferred in the third heat exchanger 142 from the REP anode exhaust to the feed water, increasing the temperature of the second portion 121 of the water. The heat evaporates liquid water present in the second portion 121 and superheats the steam. The REP anode exhaust is then fed to a third reformer 144, in which the REP anode exhaust is reformed (e.g., partially reformed), to remove all CO from an output stream. The output from the REP anode 110 contains $CH_4$, $CO_2$, and traces of CO, as well as hydrogen. Many devices that use hydrogen are sensitive to and/or cannot tolerate CO. However, by passing the stream output from the REP anode 110 across reforming catalysts at a lower temperature, all of the CO in the stream is converted to $CH_4$ and $CO_2$. Because there is so little CO and $CO_2$ in the stream output from the REP anode 110, only a minor portion of the hydrogen in the stream is consumed. It should be noted that if the hydrogen is being used in a system that is tolerant of CO, the stream may be output without passing through the third reformer 144. Referring still to FIG. 1, the output stream is then fed through a fourth heat exchanger 146. Heat is transferred in the fourth heat exchanger 146 from the REP anode exhaust to the second portion 121 of the water, further increasing the temperature of and partially vaporizing the water. As shown in FIG. 1, the second portion 121 of the water is heated in the fourth heat exchanger 146 and then the third heat exchanger 142 before being mixed with the second portion 127 of the slightly reformed feed gas to form the hydrated feed gas with higher water content.

At least a portion of the output stream may be exported from the system 100 for storage or other use, or may be used in the system 100 for other purposes. Some users of hydrogen may require a high-purity and/or high-pressure hydrogen. In these cases, a hydrogen purification and/or pressurization device 145 may be included in the system 100. If the output stream is purified, the impurities (mainly $CH_4$) may be recycled to the feed system 113 via a recycling line 155 and mixed with the other fuel supplied to the fuel cell 102 and the REP 108.

With respect to the REP cathode 112, air may be fed from the air supply 134, through a second heat transfer element 148 in the AGO 132 and received in the REP cathode 112. Specifically, as the air passes through the second heat transfer element 148, heat is transferred from the oxidization reaction in the AGO 132 to the air, increasing the temperature of the air. This preheated air introduced to the REP cathode 112 is used as sweep gas, which reduces the concentration of $CO_2$ and $O_2$ in the REP cathode 112. This process results in a lower voltage across the REP 108 and power consumption. If $CO_2$ and $O_2$ is desired as a byproduct, the system 100 may also operate without sweep gas. However, it should be noted that the use of sweep gas helps to maintain a uniform temperature in the REP cathode 112, thereby maximizing the life of the REP 108.

As described above, FIG. 1 depicts an embodiment that utilizes waste heat from the fuel cell 102 to heat (e.g., in the first heat exchanger 122) and enable partial reformation (e.g., in first reformer 124) of a portion of feed gas (i.e., the second portion 127 of the slightly reformed feed gas) to the REP 108. This waste heat may be considered to be external to the fuel cell 102 because the waste heat is conveyed in the exhaust stream from the fuel cell cathode 106. As described below, other embodiments may utilize waste heat internal to fuel cell 102 to enable partial reformation of at least a portion of the feed gas to the REP. For example, an indirect reforming unit 229 may utilize waste heat from the exothermic reactions within fuel cell 102. Further, FIG. 1 depicts an embodiment that utilizes anode exhaust from the fuel cell 102 (e.g., after it is oxidized in AGO 132) to heat (via the first heat transfer element 138) and enable additional partial reformation (e.g., in the second reformer 140) of a feed gas to the REP 108. However, as described below, it should be understood that in other exemplary embodiments anode exhaust may be utilized in different ways. For example, according to other exemplary embodiments may anode exhaust may be mixed (i.e., blended) with a feed gas to an REP, to provide the REP feed gas with sufficient hydrogen content.

Figure 2:
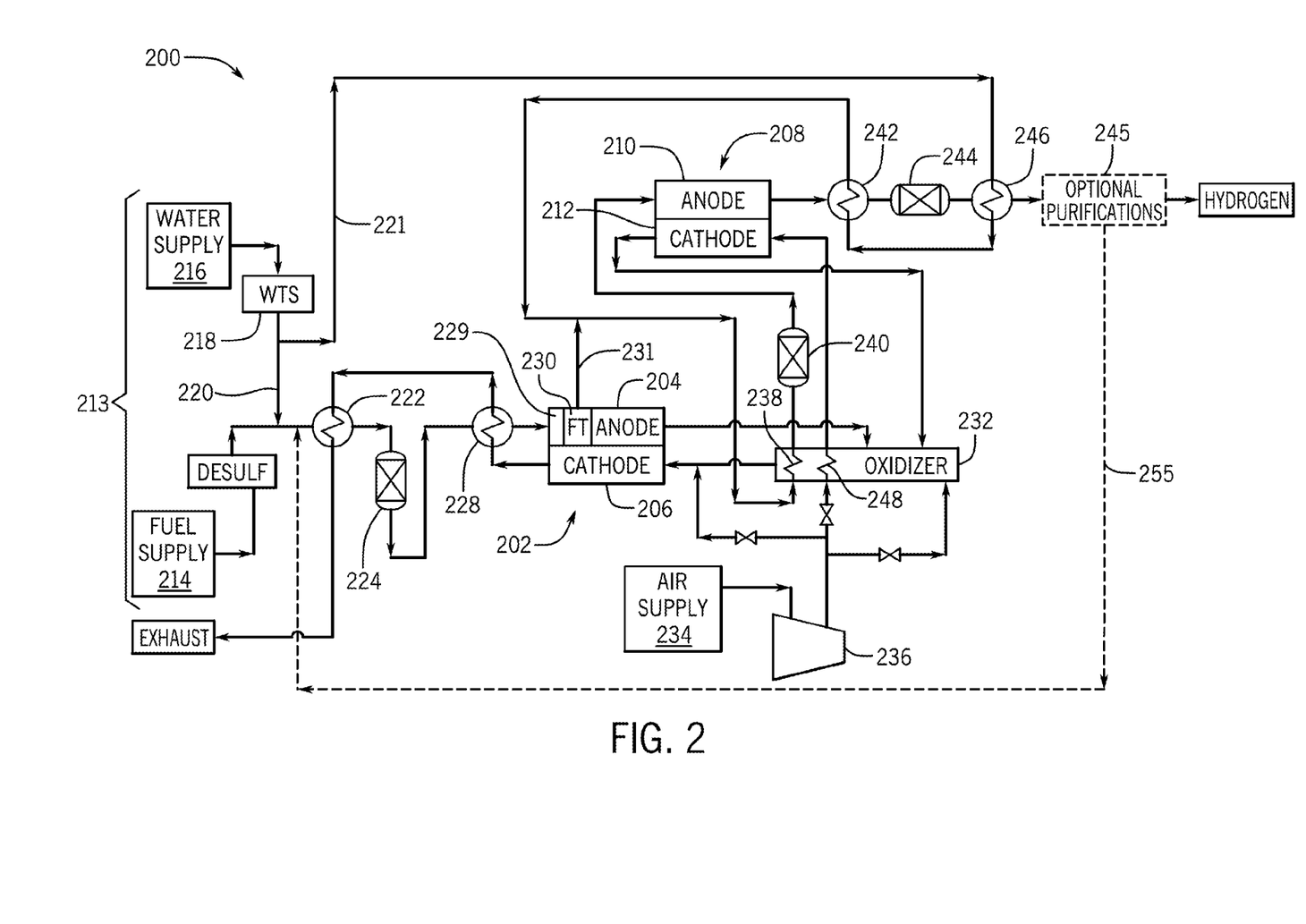
FIG. 2 is a schematic view of another embodiment of the fuel cell system, which feeds fuel turn gas to the REP after additional reforming.

Referring now to FIG. 2, a fuel cell system 200 is shown according to an exemplary embodiment. In fuel cell system 200, excess fuel is sent to a fuel-cell 202 and output from an indirect reforming unit 229 as excess fuel turn gas rather than feeding all of the fuel turn gas directly to the anode of a fuel cell, as shown in FIG. 1. The excess fuel provides additional cooling to the system 200, allowing the system 200 to operate at a higher load. Further, the majority of reforming required to maintain a proper heat balance in an REP 208 is performed in indirect reforming unit 229. This reforming may be performed without adding equipment (i.e., components) to the system 200, thereby reducing cost and complexity of the system 200 capable of maintaining proper heat balance. With reference to FIG. 2, like reference numerals to FIG. 1 denote similar elements. The system 200 includes a fuel cell 202, having an anode 204 and a cathode 206. The system 200 further includes an REP 208 (e.g., a second fuel cell), having an REP anode 210 and an REP cathode 212.

Fuel and water are fed to the system 200 as part of a feed system 213, for operation of the fuel cell 202 to output power and of the REP 208 to output hydrogen. The feed system 213 includes a fuel supply 214 and a water supply 216. The fuel fed to the system 200 from the fuel supply 214 may include natural gas, anaerobic digester gas ("ADG"), and/or other suitable fuel. The fuel is then desulfurized, such that it may be received in the fuel cell 202 without causing damage to or degradation of the fuel cell 202 due to sulfur buildup. The water fed to the system 200 from the water supply 216 is purified in a WTS 218. A first portion 220 of the water output from the WTS 218 is mixed with the desulfurized fuel, forming a hydrated (e.g., wet) fuel. The hydrated fuel is further mixed with hydrogen output from the REP 208 to form a feed gas.

The feed gas is then fed through a first heat exchanger 222. Heat is transferred in the first heat exchanger 222 from cathode exhaust output by the cathode 206 of the fuel cell 202 to the feed gas, increasing the temperature of the feed gas and vaporizing substantially all of the water. The heated feed gas is then fed to a first reformer 224, in which the heated feed gas is reformed (e.g., slightly reformed, partially reformed, etc.) by reacting the fuel with steam to produce hydrogen. The reforming reaction in the first reformer 224 is endothermic and preheating the feed gas in the first heat exchanger 222 prior to feeding the feed gas to the first reformer 224 provides the heat needed for the conversion of some of the feed gas to hydrogen. A small amount of hydrogen may be needed to prevent damage to the indirect reforming cells 229 inside the fuel cell 202. The first reformer 224 then outputs a slightly reformed feed gas configured to be received at the fuel cell 202.

The slightly reformed feed gas is then fed through a second heat exchanger 228. Heat is transferred in the second heat exchanger 228 from the cathode exhaust output by the cathode 206 to the reformed feed gas, increasing the temperature of the reformed feed gas. After passing through the second heat exchanger 228, the slightly reformed feed gas is then fed to the fuel cell 202 for reaction. Specifically, the slightly reformed feed gas is received in the fuel cell 202 at an indirect reforming unit 229 which outputs fuel turn gas. The indirect reforming unit 229 is disposed on (e.g., directly on) the anode 204 of the fuel cell 202 and transfers heat from the anode 204. Feed gas output from the indirect reforming unit 229 forms fuel turn gas (which is output into a fuel turn manifold 230), which is partially reformed even further in the indirect reforming unit 229. The partial reforming process in the indirect reforming unit 229 is endothermic, such that heat is passed from the anode 204 and/or the cathode 206 to the indirect reforming unit 229, thereby cooling the fuel cell 202 during operation. At least a portion of the fuel turn gas from the indirect reforming unit 229 is passed through a fuel turn manifold 230 to the anode 204.

While the fuel cell system 100 in FIG. 1 showed all of the fuel turn gas being fed directly to the anode 104, in the fuel cell system 200 shown in FIG. 2, a first portion 231 of the fuel turn gas is then output from the indirect reforming unit 229 through the fuel turn manifold 230 for use in the REP 208. The remaining fuel turn gas is then fed to the anode 204 of the fuel cell 202 for reaction. The anode 204 then outputs anode exhaust, which is fed to an anode gas oxidizer ("AGO") 232. The AGO 232 further receives air from an air supply 234, which is compressed and pumped into the AGO 232 through a compressor and/or blower 236. The AGO 232 also receives heated air used as sweep gas in the REP cathode 212. The anode exhaust is oxidized in the AGO 232 with the air from the air supply 234 and the sweep gas from the REP cathode 212, and the AGO 232 outputs an oxidized feed gas. Additional air may then be mixed with the oxidized feed gas downstream from the AGO 232 and upstream from the cathode 206 in order to provide a desired temperature to the cathode 206, which is less than an oxidizer outlet temperature of the AGO 232. The oxidized feed gas and oxygen are then fed to the cathode 206, where they are reacted and the cathode 206 outputs a cathode exhaust. The cathode exhaust is then passed through the second heat exchanger 228, where heat is transferred from the cathode exhaust to the reformed feed gas, as discussed above. The cathode exhaust is then passed through the first heat exchanger 222, where heat is transferred from the cathode exhaust to the feed gas, as discussed above. After passing through the first and second heat exchangers 222, 228, the cathode exhaust may be output from the system 200 or used in other portions of the system 200 for heat transfer or as a heat source.

According to an exemplary embodiment, fuel turn gas is fed to the REP 208. Specifically, a second portion 221 of the water from the WTS 218 is mixed with the first portion 231 of the fuel turn gas, forming a hydrated feed gas with a higher water content than the reformed feed gas. The hydrated feed gas is then received in the AGO 232 at a first heat transfer element 238. Specifically, as the hydrated feed gas passes through the first heat transfer element 238, heat is transferred from the oxidization reaction in the AGO 232 to the hydrated feed gas, increasing the temperature of the hydrated feed gas. The heated hydrated feed gas is then fed to a second reformer 240, in which the hydrated feed gas is further reformed. The second reformer 240 outputs a reformed feed gas, which is fed to the REP anode 210 for reaction in the REP 208. In this configuration, the level of reforming is controlled to improve the heat balance around the REP 208. The REP anode 210 outputs hydrogen.

The REP anode exhaust is then fed through a third heat exchanger 242. Heat is transferred in the third heat exchanger 242 from the REP anode exhaust to the feed water, increasing the temperature of the second portion 221 of the water. The heat evaporates liquid water present in the second portion 221 and may superheat the steam. The REP anode exhaust is then fed to a third reformer 244, in which CO in the REP anode exhaust is removed by conversion to $CH_4$. The output stream is then fed through a fourth heat exchanger 246. Heat is transferred in the fourth heat exchanger 246 from the REP anode exhaust to the second portion 221 of the water, further increasing the temperature of and partially vaporizing the water. As shown in FIG. 2, the second portion 221 of the water is heated in the fourth heat exchanger 246 and then the third heat exchanger 242 before being mixed with the first portion 231 of the fuel turn gas to form the hydrated feed gas.

At least a portion of the output stream may be exported from the system 200 for storage or other use. As discussed with respect to FIG. 1, a hydrogen purification and/or pressurization device 245 may be included in the system 200. If the output stream is purified, the impurities (mainly $CH_4$) may be recycled to the feed system 213 via a recycling line 255 and mixed with the other fuel supplied to the fuel-cell 202 and the REP 208.

With respect to the REP cathode 212, air may be fed from the air supply 234, through a second heat transfer element 248 in the AGO 232 and received in the REP cathode 212. Specifically, as the air passes through the second heat transfer element 248, heat is transferred from the oxidization reaction in the AGO 232 to the air, increasing the temperature of the air. This preheated air introduced to the REP cathode 212 is used as sweep gas, which reduces the concentration of $CO_2$ and $O_2$ in the REP cathode 212. This process results in a lower voltage across the REP 208 and power consumption. If $CO_2$ and $O_2$ is desired as a byproduct, the system 200 may also operate without sweep gas. However, it should be noted that the use of sweep gas helps to maintain a uniform temperature in the REP cathode 212, thereby maximizing the life of the system 200.

FIGS. 1 and 2 depict embodiments that each incorporate a second reformer 140, 240 to further partially reform feed gas to the REP. However, it should be understood that the second reformer 240 in FIG. 2 may have lighter duty than second reformer 140 in FIG. 1 because the feed gas entering second reformer 240 requires less reformation. In other words, the second reformer 240 in FIG. 2 does not reform as much feed gas as the second reformer 140 in FIG. 1 and therefore may have a smaller reformation capacity than the second reformer 140 in FIG. 1. By comparison, the feed gas entering second reformer 240 in FIG. 2 contains more hydrogen than the feed gas entering second reformer 140 in FIG. 1 because the feed gas in FIG. 2 has undergone partial reformation in the indirect reforming unit 229. As a result, the second reformer 240 may be smaller than the second reformer 140 for similar systems.

Figure 3:
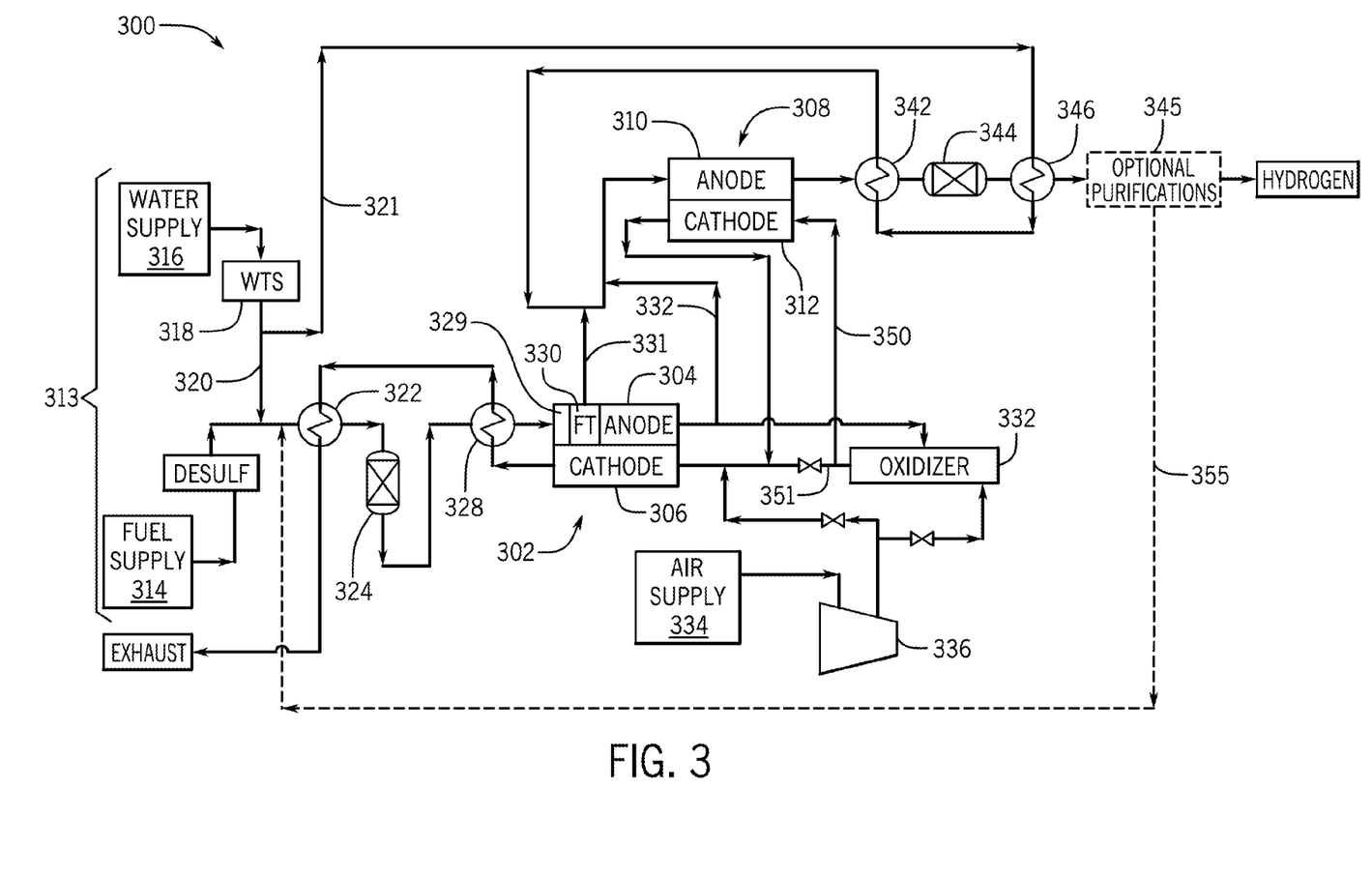
FIG. 3 is a schematic view of another embodiment of the fuel cell system, which feeds fuel turn gas directly to the REP after it is mixed with fuel cell anode exhaust. This configuration may reduce manufacturing costs but increase operating costs.

Referring now to FIG. 3, a fuel cell system 300 is shown according to an exemplary embodiment. In fuel cell system 300, excess fuel is sent to a fuel cell 302 and output from an indirect reforming unit 329 as excess fuel turn gas and fed directly to the REP anode rather than feeding all of the fuel turn to the anode of a fuel cell, as shown in FIG. 1, or processing the fuel turn gas through reformer, as shown in FIG. 2. In this configuration, some of the anode exhaust gas which is essentially fully reformed, is mixed with the fuel turn gas to provide a total level of reforming in the combined gas feed to an REP 308 to the desired level to maintain a good heat balance in temperature profile in the REP 308. With reference to FIG. 3, like reference numerals to FIGS. 1 and 2 denote similar elements. The system 300 includes a fuel cell 302, having an anode 304 and a cathode 306. The system 300 further includes an REP 308 (e.g., a second fuel cell), having an REP anode 310 and an REP cathode 312.

Fuel and water are fed to the system 300 as part of a feed system 313, for operation of the fuel cell 302 to output power and of the REP 308 to output hydrogen. The feed system 313 includes a fuel supply 314 and a water supply 316. The fuel fed to the system 300 from the fuel supply 314 may include natural gas, anaerobic digester gas ("ADG"), or other suitable fuel. The fuel is then desulfurized, such that it may be received in the fuel cell 302 without causing damage to or degradation of the fuel cell 302 due to sulfur buildup. The water fed to the system 300 from the water supply 316 and is purified in a WTS 318. A first portion 320 of the water output from the WTS 318 is mixed with the desulfurized fuel, forming a hydrated (e.g., wet) fuel. The hydrated fuel may be further mixed with hydrogen output from the REP 308 to form a feed gas.

The feed gas is then fed through a first heat exchanger 322. Heat is transferred in the first heat exchanger 322 from cathode exhaust output by the cathode 306 of the fuel cell 302 to the feed gas, increasing the temperature of the feed gas and vaporizing substantially all of the water. The heated feed gas is then fed to a first reformer 324, in which the heated feed gas is reformed (e.g., slightly reformed, partially reformed, etc.) by reacting the fuel with steam to produce hydrogen. The reforming reaction in the first reformer 324 is endothermic and preheating the feed gas in the first heat exchanger 322 prior to feeding the feed gas to the first reformer 324 provides the heat needed for the conversion of some of the feed gas to hydrogen. A small amount of hydrogen may be needed to prevent damage to the indirect reforming cells 329 inside the fuel cell 302. The first reformer 324 then outputs a reformed feed gas configured to be received at the fuel cell 302.

The slightly reformed feed gas is then fed through a second heat exchanger 328. Heat is transferred in the second heat exchanger 328 from the cathode exhaust output by the cathode 306 to the reformed feed gas, increasing the temperature of the reformed feed gas. After passing through the second heat exchanger 328, the slightly reformed feed gas is then fed to the fuel cell 302 for reaction. Specifically, the slightly reformed feed gas is received in the fuel cell 302 at an indirect reforming unit 329 which outputs fuel turn gas. The indirect reforming unit 329 is disposed on (e.g., directly on) the anode 304 of the fuel cell 302 and a fuel turn manifold 330 is configured to pass at least a portion of the feed gas from the indirect reforming unit 329 to the anode 304. Feed gas output from the indirect reforming unit 329, forms fuel turn gas, which is partially reformed further in the indirect reforming unit 329. The partial reforming process in the indirect reforming unit 329 is endothermic, such that heat is passed from the anode 304 and/or the cathode 306 to the indirect reforming unit 329, thereby cooling the fuel cell 302 during operation. At least a portion of the fuel turn gas from the indirect reforming unit 329 is passed through the fuel turn manifold 330 to the anode 304.

While the fuel cell system 200 in FIG. 2 showed the first portion 231 of the fuel turn gas being fed through the first heat transfer element 238 and the second reformer 240 before being fed to the REP anode 210, in FIG. 3, a first portion 331 of the fuel turn gas is output from the indirect reforming unit 329 for use directly in the REP 308 without further intervening processing other than mixing with anode exhaust gas from the fuel cell. The remaining fuel turn gas is then fed to the anode 304 of the fuel cell 302 for reaction. The anode 304 then outputs anode exhaust, which is fed to an anode gas oxidizer ("AGO") 332 and the REP 308. The AGO 332 further receives air from an air supply 334, which is compressed and pumped into the AGO 332 through a compressor and/or blower 336. The anode exhaust is oxidized in the AGO 332 with the air from the air supply 334, and the AGO 332 outputs an oxidized feed gas. Additional air may then be mixed with the oxidized feed gas downstream from the AGO 332 and upstream from the cathode 306 in order to provide a desired ratio of oxidized feed gas and oxygen for reaction in the cathode 306. Because fuel turn gas output from the fuel turn manifold 330 has not been reformed to the level needed to provide proper heat balance to the REP 308, a portion of the anode exhaust is mixed with this fuel turn gas. Anode exhaust may be added as required to balance heat in the REP 308 and provide a desired thermal profile in the REP 308.

According to an exemplary embodiment, a first portion 350 of the oxidized feed gas is fed to the REP cathode 312 for sweeping the REP 308 cathode and diluting the $CO_2$ and $O_2$ from the REP 308. It should also be noted that oxidized feed gas may be used for sweeping the REP 108, 208, discussed above. Referring still to FIG. 3, the REP cathode 312 then outputs an REP cathode exhaust, which is mixed with a remaining second portion 351 of the oxidized feed gas and mixed with additional air from the air supply 334, as discussed above. The mixture of air, oxidized feed gas, and REP cathode exhaust are then fed to the cathode 306, where they are reacted and the cathode 306 outputs a cathode exhaust. The $CO_2$ and $O_2$ from the REP 308 increases the voltage across the fuel cell 302 and power output from the fuel-cell 302. The cathode exhaust is then passed through the second heat exchanger 328, where heat is transferred from the cathode exhaust to the reformed feed gas, as discussed above. The cathode exhaust is then passed through the first heat exchanger 322, where heat is transferred from the cathode exhaust to the feed gas, as discussed above. After passing through the first and second heat exchangers 322, 328, the cathode exhaust may be output from the system 300 or used in other portions of the system 300 for heat transfer or as a fuel source (e.g., in other fuel cells).

According to an exemplary embodiment, fuel turn gas is fed to the REP 308. Specifically, a second portion 321 of the water from the WTS 318 is mixed with the first portion 331 of the fuel turn gas, forming a hydrated feed gas with higher water content. The hydrated feed gas is then fed directly to the REP anode 310 for reaction in the REP 308. The REP anode 310 outputs REP anode exhaust, which includes hydrogen. As shown in FIG. 3, a portion of the anode exhaust may also be mixed with the hydrated feed gas for introduction to the REP anode 310 and the remaining portion of the anode exhaust is fed to the AGO 332.

The REP anode exhaust is then fed through a third heat exchanger 342. Heat is transferred in the third heat exchanger 342 from the REP anode exhaust to the feed gas, increasing the temperature of the second portion 321 of the steam. For example, the heat may evaporate any liquid water present in the second portion 321 or may superheat the steam. The REP anode exhaust is then fed to a third reformer 344, in which the REP anode exhaust is reformed (e.g., partially reformed), to further produce an output stream including hydrogen. The output stream is then fed through a fourth heat exchanger 346. Heat is transferred in the fourth heat exchanger 346 from the REP anode exhaust to the second portion 321 of the steam, further increasing the temperature of the steam. As shown in FIG. 3, the second portion 321 of the steam is preheated in the fourth heat exchanger 346 and then the third heat exchanger 342 before being mixed with the first portion 331 of the fuel turn gas to form the hydrated feed gas.

At least a portion of the output stream may be exported from the system 300 for storage or other use, or may be used in the system 300 for other purposes. Further, as discussed above, a portion of the outlet stream may be mixed with the hydrated fuel prior to feeding the hydrated fuel to the first reformer 324.

According to certain embodiments described in this application, a portion of partially reformed fuel is taken from the fuel turn manifold 230, 330 and sent to the REP. This results in certain benefits compared to (a) sending partially reformed fuel from an external indirect reformer; or (b) sending partially reformed/partially spent fuel from anode exhaust.

In the case of (a), an external indirect reformer requires heat to drive the reforming process. However, the indirect internal reformer used in certain embodiments of this disclosure utilizes waste heat of adjacent fuel cell packages (e.g., adjacent to the anode) to drive the reforming process. It is more efficient to reform within the indirect internal reformer than the external indirect reformer. Of course, the external indirect reformer is still useful as a pre-reformer, as can be seen in FIG. 1-3.

In the case of (b), the anode exhaust has a lower amount of hydrogen relative to the carbon in the gas when compared to fuel turn gas, which has not been electrochemically reacted within the fuel cell and requires a relatively higher power input to the REP per unit (e.g., kg) of hydrogen produced.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, values of parameters, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell system comprising:
    a fuel cell comprising:
        an anode; and
        a cathode configured to output cathode exhaust; and
        wherein the fuel cell is configured to generate waste heat;
    a reformer configured to partially reform a feed gas using the waste heat and output a hydrogen-containing stream; and
    a reformer-electrolyzer-purifier ("REP") comprising:
        an REP anode configured to receive a first portion of the hydrogen-containing stream; and
        an REP cathode;
    an anode gas oxidizer ("AGO") configured to receive anode exhaust from the anode;
    wherein the AGO is configured to oxidize the anode exhaust with air from an air supply; and
    wherein the AGO is configured to receive heated sweep gas from the REP cathode.

2. The fuel cell system of claim 1, further comprising:
    a heat exchanger configured to heat the feed gas using the waste heat and to output a heated feed gas;
    wherein the waste heat is conveyed to the heat exchanger in the cathode exhaust; and
    wherein the reformer is configured to receive the heated feed gas.

3. The fuel cell system of claim 1, wherein the fuel cell is configured to receive a remaining portion of the hydrogen-containing stream.

4. The fuel cell system of claim 1, further comprising:
    an indirect reforming unit disposed on the anode;
    wherein the indirect reforming unit is configured to further reform the hydrogen-containing stream and output a fuel turn gas.

5. The fuel cell system of claim 4, wherein:
    a first portion of the fuel turn gas is the first portion of the hydrogen-containing stream received by the REP anode; and
    the anode is configured to receive a remaining portion of the fuel turn gas.

6. The fuel cell system of claim 4, wherein the REP anode is configured to receive a portion of anode exhaust output from the anode.

7. The fuel cell system of claim 4, wherein the anode is configured to receive a remaining portion of the fuel turn gas output from the indirect reforming unit.

8. The fuel cell system of claim 4, further comprising:
    a heat transfer element disposed in the AGO;
    wherein the fuel cell system is configured to mix a first portion of the fuel turn gas with water from a water supply to form a hydrated feed gas;
    wherein the heat transfer element is configured to receive the hydrated feed gas and transfer heat from an oxidation reaction in the AGO to the hydrated feed gas; and
    wherein the REP anode is configured to receive the hydrated feed gas from the heat transfer element.

9. The fuel cell system of claim 1, further comprising:
    a heat transfer element disposed in the AGO;
    wherein the fuel cell system is configured to mix the first portion of the hydrogen-containing stream with water from a water supply to form a hydrated feed gas; and
    wherein the heat transfer element is configured to receive the hydrated feed gas and to transfer heat from an oxidation reaction in the AGO to the hydrated feed gas.

10. The fuel cell system of claim 9, wherein the REP anode is configured to receive the hydrated feed gas from the heat transfer element.

11. The fuel cell system of claim 1, further comprising a heat transfer element disposed in the AGO and configured to receive air from the air supply and transfer heat from an oxidation reaction in the AGO to the air passing through the heat transfer element.

12. A method of operating a fuel cell system comprising:
    providing a fuel cell having an anode and a cathode;
    providing a reformer;
    providing an REP having an REP anode and an REP cathode;
    generating waste heat from the fuel cell;
    heating feed gas with the waste heat, forming heated feed gas;
    partially reforming the heated feed gas in the reformer and outputting a hydrogen-containing stream;
    hydrating a first portion of the hydrogen-containing stream with steam from a water supply to form a hydrated feed gas;
    reforming the hydrated feed gas and outputting a reformed hydrated feed gas;
    feeding the reformed hydrated feed gas to the REP anode;
    feeding a remaining portion of the hydrogen-containing stream to the anode; and
    outputting anode exhaust from the anode.

13. The method of claim 12, further comprising mixing a portion of the anode exhaust with the hydrated feed gas prior to introduction to the REP anode.

14. A fuel cell system comprising:
    a feed system comprising:
        a water supply; and
        a fuel supply;
        wherein the feed system is configured to purify water from the water supply and fuel from the fuel supply; and
        wherein the feed system is configured to mix the water and fuel to form a hydrated feed gas;
    a fuel cell comprising:
        an anode configured to receive a first portion of the hydrated feed gas; and
        a cathode; and
    a reformer-electrolyzer-purifier ("REP") comprising:
        an REP anode configured to receive a second portion of the hydrated feed gas; and an REP cathode;
at least one of a hydrogen purification device or a hydrogen pressurization device configured to recycle at least a portion of hydrogen output from the REP anode to the feed system;
wherein the fuel cell system is configured to mix at least a portion of hydrogen output from the REP anode with the hydrated feed gas.

15. The system of claim 14, further comprising a water treatment system configured to purify the water from the water supply.

16. The system of claim 14, further comprising a first heat exchanger configured to receive the hydrated feed gas and to vaporize at least a portion of the water in the hydrated feed gas.

17. The system of claim 16, further comprising a second heat exchanger configured to receive the hydrated feed gas and to vaporize the water in the hydrated feed gas remaining after passing through the first heat exchanger.

18. The system of claim 14, further comprising a reformer configured to reform a portion of the hydrated feed gas to hydrogen.

* * * * *